(12) United States Patent
Kohsaka et al.

(10) Patent No.: US 6,258,741 B1
(45) Date of Patent: *Jul. 10, 2001

(54) CORROSION-RESISTANT MEMBER

(75) Inventors: Shoji Kohsaka; Yumiko Itoh; Hitoshi Matsunosako; Hidemi Matsumoto; Masahito Nakanishi, all of Kokubu (JP)

(73) Assignee: Kyocera Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,030

(22) Filed: Nov. 30, 1998

(30) Foreign Application Priority Data

Dec. 1, 1997 (JP) ...................................... 9-330683

(51) Int. Cl.$^7$ .................................................. C04B 35/563
(52) U.S. Cl. ............................................... 501/87; 501/91
(58) Field of Search .......................................... 501/87, 91

(56) References Cited

U.S. PATENT DOCUMENTS

| | | | |
|---|---|---|---|
| 3,914,371 | * | 10/1975 | Benton et al. . |
| 4,005,235 | * | 1/1977 | Prozchazka . |
| 4,081,284 | * | 3/1978 | Prochazka et al. . |
| 4,195,066 | * | 3/1980 | Schwetz ............................... 423/291 |
| 4,320,204 | * | 3/1982 | Weaver ................................ 501/91 |
| 4,524,138 | * | 6/1985 | Schwetz et al. ...................... 501/90 |
| 5,039,633 | * | 8/1991 | Pyzik et al. .......................... 501/93 |
| 5,545,687 | * | 8/1996 | Burns et al. ........................ 524/701 |
| 5,554,328 | * | 9/1996 | Kondakov ............................ 264/60 |

FOREIGN PATENT DOCUMENTS

08012434 * 1/1996 (JP) .

* cited by examiner

*Primary Examiner*—Paul Marcantoni
(74) *Attorney, Agent, or Firm*—Hogan & Hartson L.L.I

(57) ABSTRACT

This invention relates to a corrosion-resistant member used in a region in which a gas or a plasma of a halogen-containing compound is used, in a process for producing semiconductors, especially a member used as jigs such as a supporter for supporting a material to be treated, or as an inner wall member in an apparatus for producing semiconductors, which has a high corrosion resistance to a fluorine type or a chlorine type corrosive gas, or a fluorine type or a chlorine type plasma. According to this invention, there are provided a corrosion-resistant member to be used ina region in which a gas or plasma of a halogen compound is used in a process of producing a semiconductor, wherein at least surface exposed to the gas or plasma is formed of a boron carbide sintered body having a relative density of at least 96% and containing 300 ppm or below, in a total amount, of an alkali metal, an alkalin earth metal and a transition metal, and a process for producing the same.

5 Claims, 2 Drawing Sheets

CORROSION-RESISTANT MEMBER

BACKGROUND OF THE INVENTION

1. Field of the Invention

This invention relates to a corrosion-resistant member used in a region in which a gas or a plasma of a halogen-containing compound is used in a process for producing semiconductors, especially a member used as jigs such as a supporter for supporting a material to be treated, or as an inner wall member in an apparatus for producing semiconductors, which has a high corrosion resistance to a fluorine type or a chlorine type corrosive gas, or a fluorine type or a chlorine type plasma.

2. Prior Art

A process used in the production of highly integrated circuit elements such as semiconductor elements, including a dry process and a plasma process utilizing a plasma such as plasma coating, has been rapidly advanced in recent years. As the plasma process in the production of semiconductors, a halogen-type corrosive gas such as the fluorine type has been utilized in vapor deposition, etching or cleaning because of its high reactivity.

Members to be contacted with corrosive gases are required to have high corrosion resistance. As members to be contacted with the plasma in addition to the material to be treated generally include materials containing $SiO_2$ as a main component such as glass or quartz, or metals such as stainless steel or Monel.

In the production of semiconductors, as susceptor for holding and fixing a wafer, an alumina fired product, sapphire, a sintered product of AlN, and surface coated products of the above products by the CVD method are used because they have an excellent corrosion resistance. Furthermore, heaters obtained by coating graphite and boron nitride are used.

However, glass and quartz used heretofore have insufficient corrosion resistance and are consumed violently, and when they contact a gas or a plasma of a halogen compound, especially a fluorine or chlorine plasma, the contacting surface is etched, and the surface properties will change. Therefore, production conditions for the semiconductor, and especially etching conditions will be affected. Since a member using a metal such as stainless steel has insufficient corrosion resistance, corrosion causes the occurrence of poor products especially in the production of semiconductors.

Although sintered products of alumina and AlN have excellent corrosion resistance to fluorine-type gases as compared with the above materials, when they contact the plasma at high temperatures, their corrosion gradually proceeds and the removal of crystal particles occurs from the surface of the sintered products, and this becomes a cause of the occurrence of particles.

The occurrence of particles, even very fine particles formed by ion bombardment or reaction in a gaseous phase, becomes a cause of inconveniences such as the deterioration of properties of an element such as disconnected metal wirings or defects of pattern, or the reduction of the yield which occur by the high integration of a semiconductor and a further cleaning of the process.

To solve this problem, the present inventors proposed to form a corrosion resistant member from a material composed of 2A and 3A elements of the periodic table as a main component which forms a halogen compound stable to the surface of the material against a fluorine or chlorine-type plasma. However, the material composed of elements of Group 2A and 3A of the periodic table as main component is stable to a fluorine or chlorine-type plasma, but has a defect that the removal of a halogen compound formed on the surface of the material or a reaction in a vapor phase causes the occurrence of particles.

SUMMARY OF THE INVENTION

The present inventors have repeated experiments on a highly corrosion resistant material which does not generate particles, and which does not contain elements that deteriorate the properties of a semiconductor, and which is resistant to a gas or plasma of a halogen compound, especially a flurine or chlorine-type corrosive gas or plasma. Since a dense boron carbide produces a reaction product having a high vapor pressure even when it reacts with a halogen compound, especially fluorine or chlorine, the reaction product is released as a gas out of the reaction system without generating particles, and moreover, since boron carbide is difficult to react with an oxygen-free halogen compound, especially a fluorine-type or chlorine-type corrosive gas or plasma, the resulting product has excellent corrosion resistance.

According to this invention, there is provided a corrosion resistant member to be used in a region in which a gas or a plasma of a halogen compound is used in a process for the production of a semiconductor, wherein at least surface to be exposed to the gas or plasma is formed from a boron carbide sintered body having a relative density of at least 96% and containing 300 ppm or below, in a total amount, of metal elements consisting of alkali metals, alkaline earth metals and transition metals.

In the above corrosion resistant member, it is preferred that the above sintered body comprises boron carbide as a main component and 0.5 to 5% by weight of silicon carbide, and in an X-ray diffraction measurement, when the peak intensity of a diffraction peak assigned to the (311) face of boron carbide is Ia and the peak intensity of a diffraction peak assigned to the (002) face of graphite Ib., the peak intensity ratio expressed by Ib/Ia is 0.01 or below.

In the present invention, there is also provided a process for producing a corrosion resistant member composed of a sintered body of boron carbide used in a region in which a gas or a plasma of a halogen compound is used in a process for producing a semiconductor, wherein the process comprises a step of molding a boron carbide having an average particle diameter of 5 $\mu$m or below and a cation impurity of not larger than 5000 ppm into a predetermined shape, a step of heat-treating the resulting molded article in vacuum at 1600 to 2100° C. under 5 Pa or below so that the total amount of alkali metals, alkaline earth metals and trasition metals becomes 300 ppm or below, and a step of making the molded product dense at a temperature of 1900 to 2250° C. by firing the molded product under the above conditions to produce a product having a relative density of at least In the above production process, as a sintering aid a powder of a carbon source in an amount calculated as a carbon and/or a powder of silicon carbide in an amount calculated as silicon carbide in a total amount of 0.5 to 10% by weight are added to the boron carbide powder, and the resulting mixture can be molded in a predetermined shape. In this case, as the powder of the carbon source, a carbon powder and/or a powder of an organic compound convertible into carbon by heat decomposition can be used. Furthermore, as the powder of the source of silicon carbide, a powder of silicon carbide and/or a powder of an organic silicon compound convertible to silicon carbide by heat decomposition can be used. As a preferred embodiment, in the mixed powder mentioned above, the powder of the silicon carbide source can be used in an amount of 0.5 to 5% by weight calculated as silicon carbide, and the powder of the carbon source can be used in an amount of 0.5 to 5% by weight calculated as carbon. Furthermore, it is preferred that the powder of of the carbon source and the powder of silicon carbide source may have an average particle diameter of 1 µm or below.

In the above production process, to convert carbon in the powder of boron carbide mixture into SiC or boron carbide ($B_4C$), namely to remove graphite, it is possible to add metal silicon powder or metallic boron powder to the boron carbide powder mixture. Specific embodiments can be cited as follows.

There is provided a process for producing a corrosion resistant member, which comprises a step of mixing 4 to 12% by weight of a powder of metallic boron having an average particle diameter of 3 µm or below and 0.5 to 5% by weight calculated as carbon or an organic compound convertible to carbon by heat decomposition with a boron carbide having an average particle diameter of 5 µm or below, a step of molding the mixture obtained in the above step into a predetermined shape, a step of heat treating the molded article in the above step in vacuum at a temperature of 1600 to 2100° C. and below 5 Pa so that the total amount of alkali metals, alkaline earth metals and transition metals becomes 300 ppm or below, and a step of making the treated molded article dense by firing the molded article at a temperature of 1900 to 2250° C. to a relative density of at least 96%.

There is also provided a process for producing a corrosion resistant member which comprises a step of mixing 0.5 to 5% by weight, calculated as silicon carbide, of a metallic silicon powder having an average particle diameter of 5 µm or below, or a mixture of the above metallic silicon and a silicon carbide powder having an average particle diameter of 1 µm or below, or a mixture of the metallic silicon and an organic compound convertible to silicon carbide by heat decomposition and 0.5 to 5% by weight, calculate as carbon, of a carbon powder or an organic compound convertible to carbon by heat decomposition with a boron carbide powder having an average particle diameter of 5 µm or below, a step of molding the resulting mixture into a predetermined shape, a step of heat treating the molded product obtained in the above step in vacuum at a temperature of 1600 to 2100° C. under 5 Pa or below so that the total amount of alkali metals, alkaline earth metals and transition metals becomes 300 ppm or below. and a step of making the molded article dense by firing the molded article at a temperature of 1900 to 2250° C. to form a dense product having a relative density of at least 96%.

According to this invention, by using a material composed of boron carbide as a main component as a member to be exposed to a fluorine-type or chlorine-type corrosive gas, a corrosion resistant member having durability for an extended period of time in a fluorine-type gas or chlorine-type corrosive atmosphere and being free from contamination and being free from the occurrence of particles can be obtained. By using the corrosion resistant member as a member such as, especially, an inner wall member of a plasma treating apparatus and jigs used in an apparatus for the production of semiconductors including a supporter for holding a treated product, the yield of semiconductors can be raised, and semiconductor elements having high quality can be produced.

Since the corrosion resistant member of this invention is formed from a sintered body of boron carbide having 300 ppm or below of the contents of alkali metals, alkaline earth metals and transition metals and a relative density of at least 96%, it has excellent flexural strength and high purity.

DETAILED DESCRIPTION OF THE PREFERRED EMBODIMENTS

[corrosion resistant member]

Figure 1:
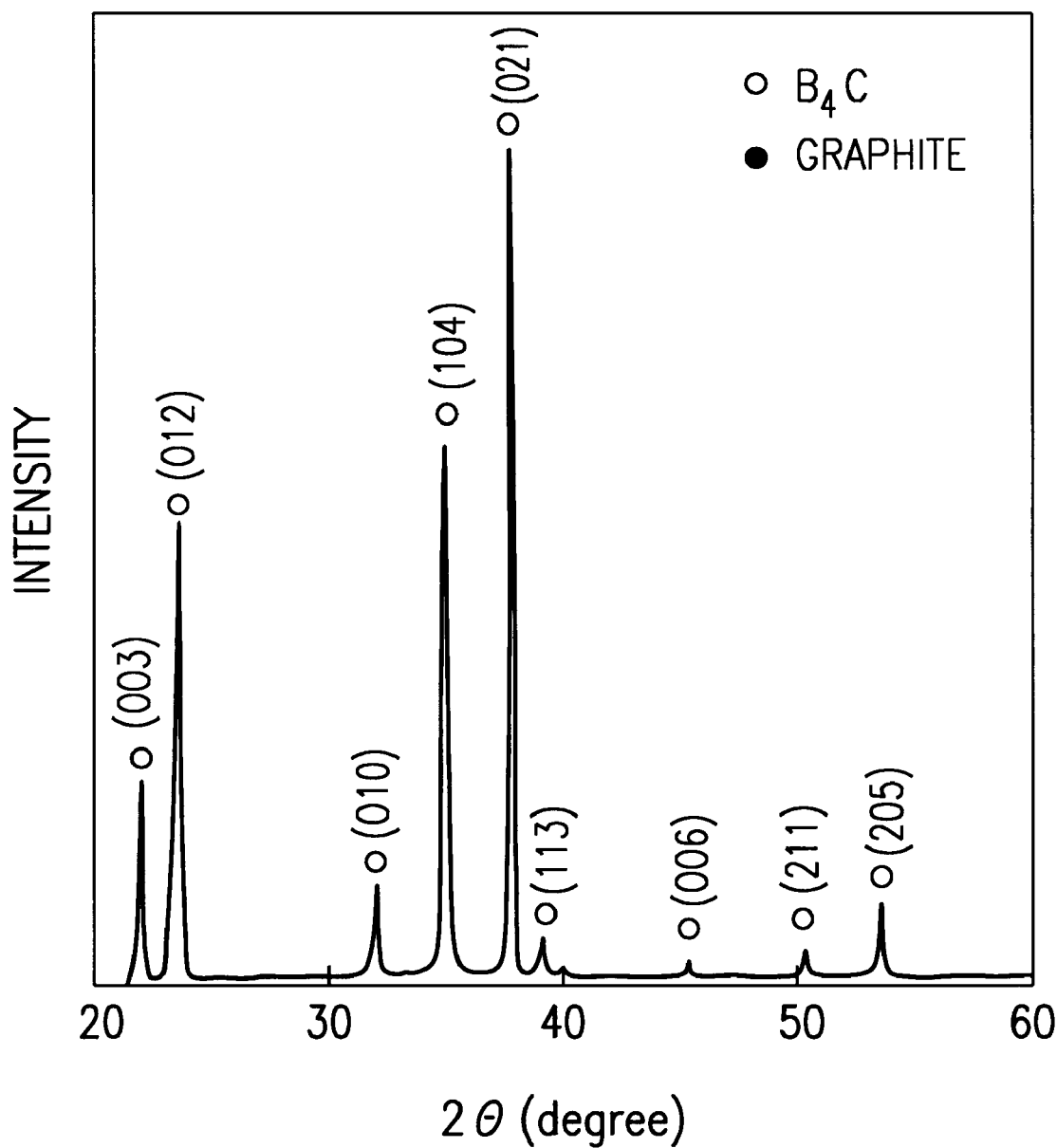
FIG. 1 is a diagram showing an X-ray diffraction chart of a boron carbide sintered body (sample No. 3 in Example 4) of this invention.

The corrosion resistant member of this invention is a member which is exposed to a fluorine-type or chlorine-type halogen corrosive gas or plasma. Examples of the fluorine-type gas are $SF_6$, $CF_4$, $CHF_3$, $ClF_3$ and HF. Examples of the chlorine-type gas include $Cl_2$, $BCl_3$ and HCl. These gases are converted to plasma by introducing microwaves or high frequencies into an atmosphere in which these gases are introduced.

According co this invention, that portion of the corrosion resistant member which is exposed to a halogen-type corrosive gas or its plasma is constructed of a boron carbide ($B_4C$) sintered body having a relative density of at least 96%. To maintain the durability of this member, this member desirably have a flexural strength of at least 200 MPa, especially at least 300 MPa.

When the boron carbide sintered body has a low density and contains large amounts of pores, the contacting area with the corrosive gas or plasma increases and its consumption becomes rapid. The contacting portion with at least gas or plasma desirably is composed of a dense body having a porosity of 0.2% or below and having a relative density of at least 96%, especially at least 98%, especially at least 99%. If the relative density is less than 96%, the strength of the dense body is decreased. The above relative density is expressed in percentage based on the theoretical density. The theoretical density of the boron carbide sintered tody somewhat differs depending upon production conditions, but is about 2.50 to about 2.52 $g/cm^3$.

The boron carbide sintered body in the corrosion resistant member of this invention contains alkali metals (such as Li, Na, K, Rb and Cs), alkaline earth metals (such as Be, Mg, Ca, Sr and Ba), and transition metal elements (such as Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au and Hg, lanthanoid elements (such as La, Ce, Pr and Nd), and actinide elements (such as Ac, Th and Pa) in a total amount of 300 ppm or below, preferably 150 ppm or below, more preferably 30 ppm or below. If the total amount of the metal elements is larger than 300 ppm, when the corrosion resistant member of this invention is used in an apparatus for producing semiconductors, the product will be contaminated during the production of semiconductors, and the characteristics of the semiconductors will be deteriorated.

A further preferred embodiment is when the amount of each of the alkali metal, alkaline earth metal and transition metal is 100 ppm or below, preferably 50 ppm or below, more preferably 10 ppm or below.

In the member composed of the boron carbide sintered body, the contents of Si, Ge, Mo and W which become corroded by halogen-type (such as F and Cl) corrosive gases or plasma are preferably adjusted to 1% by weight or below in the entire amount of the above metal components. This does not apply when these particles and are not present in a grain boundary.

A portion of the boron carbide sintered body which is exposed to a halogen-type corrosive gas or its plasma preferably have a thickness of at least 10 $\mu$m to impart an excellent corrosion resistance. If this portion has a thickness of smaller than 10 $\mu$m, an excellent anti-corrosion effect cannot be expected for a long period of time.

[A process for producing a corrosion-resistant member]

The corrosion-resistant member of this invention can be produced by a process having the following steps, for example, (I) a step of molding a boron carbide powder having an average particle diameter of 5 $\mu$m or below and a purity of at least 99.5%, or a sintering composition containing the boron carbide powder as a main component, (II) a step of heat-treating the molded product obtained in the above step (I) in vacuum at 1600 to 2100° C. under 10 Pa so that the total amount of the alkali metal, the alkaline earth metal and the transition metal becomes 300 ppm or below, and (III) a step of making the heat-treated molded product obtained in the step (II) dense with a relative density of at least 96% by firing the molded product at 1900 to 2250° C.

Each step will be explained.

Step (I):

The boron carbide powder which becomes a main component have an average particle diameter of 5 $\mu$m or below, preferably 2 $\mu$m or below, more preferably 1 $\mu$m or below. If the average particle diameter exceeds 5 $\mu$m, the density becomes insufficient to cause a decrease of strength.

The purity of the boron carbide powder may be at least 99.5%, It is desired that the boron carbide contains cation impurities of not larger than 5000 ppm, especially of not larger than 2000 ppm.

If the impurities is contained larger than 5000 ppm, the resulting corrosion-resistant member contains larger amounts of impurities and tends to has low corrosion resistance and strength. It cannot be a member suitable for the production of semiconductors.

Various sintering aids may be added to the boron carbide powder to increase the strength of the sintered body. Examples of the sintering aids include C (carbon). SiC (silicon carbide) and $Si_3N_4$ (silicon nitride).

Among these sintering aids, C and SiC are preferably used. In this case, as a carbon source, a carbon powder and/or a powder of an organic compound convertible to carbon by heat decomposition can be used, and as a silicon carbide source, a silicon carbide powder and/or a powder of an organic silicon compound convertible to silicon carbide by heat decomposition can be used.

To the boron carbide powder, it is preferably possible to add a powder of a carbon source in an amount calculated as carbon and/or a powder of a silicon carbide source in an amount calculated as silicon carbide in a total amount of 0.5 to 10% by weight.

The amount added of the silicon carbide source is, for example, 0.5 to 5% by weight, preferably 0.5 to 2% by weight, and more preferably 0.5 to 1% by weight, calculated as silicon carbide. It this amount is smaller than 0.5% by weight, it tends to be difficult to make the product dense. If the amount exceeds 5% by weight, boron carbide causes particle growth, and tends to reduce strength.

Examples of the organic silicon compounds include polycarbosilane, polysilastyrene, polysilazane, and 5% by weight, preferably 1 to 4% by weight, calculated as carbon. If the amount added is smaller than 0.5% by weight, it tends to be difficult to make the starting compound dense. If the amount exceeds 5% by weight, the particle growth of boron carbide tends to be restrained to prevent boron carbide from making it dense.

This carbon source reacts with $B_2O_3$ contained in the main material of boron carbide during sintering to act to remove oxygen. Since $B_2O_3$ hampers sinterability, when $B_2O_3$ is reduced and decomposed, sinterability is promoted. Accordingly, if the amount of carbon is smaller than 0.5% by weight, $B_2O_3$ is not sufficiently reduced, and it tends to be difficult to make boron carbide dense. If the amount of carbon exceeds 5% by weight, the particle growth of boron carbide is suppressed and making boron carbide dense tends to be suppressed.

Examples of the organic compounds convertible to carbon include coal tar pitch, furfural alcohol, corn starch, sugars and phenol resin.

As a preferred embodiment, the above mixed powder contains 0.5 to 5% by weight of a powder of silicon carbide source calculated as silicon carbide and 0.5 to 5% by weight of a powder of carbon source calculated as carbon. It is prefered that the powder of carbon source and the powder of silicon carbide source have an average particle diameter of 1 $\mu$m or below from the view point of obtaining an excellent sintering property.

A primary starting material of boron carbide contains graphite phase as an impurity. Since this graphite phase segregates during sintering, a foreign organization tends to form in the organization of the sintered body. In addition, since this graphite phase has a low corrosion resistance to a plasma of a halogen gas, when a sintered body containing a large amount of a corrosion property, etching including the corrosion of the graphite phase as an early corrosion is promoted and the etching rate is markedly increased. Thus, there is a problem to use this sintered body as a material for a plasma-resistant member in the apparauts for producing semiconductors.

The present inventors have repeated investigations, and have found that by adding a predetermined amount of metallic boron to boron carbide or adding metallic silicon to boron carbide, metallic boron or metallic silicon reacts with an excess of carbon to convert it into boron carbide or silicon carbide, and the graphite phase can be decreased. Furthermore, it has been found that in the boron carbide sintered body, when the alkali metal, the alkaline earth metal and the transition metal are decreased, and when peak intensities of the graphite pnase obtained by X-ray diffraction measurement satisfy a specific relation, it is possible to obtain excellent strength and further durability to halogen plasma.

The powder of metallic boron has an average particle diameter of preferably 3 $\mu$m or below, more preferably 1 $\mu$m or below. Its amount added is preferably 4 to 12% by weight, especially preferably 7 to 9% by weight. If this amount added is too small, the graphite phase tends to remain. If it is large, an excess of metallic boron tends to prevent the sintered body being made dense. If the particle diameter is too large, reactability with the graphite phase is decreased.

The average particle diameter of the metallic silicon powder is preferably 5 $\mu$m or below, more preferably 2 $\mu$m or below. Its amount added is preferably 0.5 to 5% by weight, especially preferably 1 to 5% by weight, calculated as silicon carbide.

This metallic silicon reacts with the graphite during the heat-treatment (the step (II) mentioned below) to form silicon carbide. Hence, a carbon source is prevented from remaining as the graphite phase in the sintered product. If the metallic silicon has a larger average particle diameter than 5 $\mu$m, the reactability with the graphite phase is lowered and the unreacted graphite phase tends to remain.

The proportion of the graphite phase remaining in the boron carbide sintered body can be sought from X-ray diffraction measurment. Desirably, in the boron carbide sintered body of this invention, when the peak intensity of a diffraction peak assigned to (311) face of boron carbide is Ia, and the peak intensity of a diffraction peak assigned to (002) face of graphite is Ib, the peak intensity ratio expressed by Ib/Ia is 0.01 or below, especially 0.002 or below. If the peak intensity ratio is higher than 0.01, the graphite phase present in the grain boundary of the sintered body is segregated to form a different phase organization. This organization becomes a starting point, and corrosion by the plasma proceeds and a plasma resistance tends to be markedly deteriorated.

In the step (I), a boron carbide powder or a sintering composition composed of the above powder as a main component is molded into a predetermined shape by a known molding means such as a mold press, a cold hydrostatic pressure press, injection molding and extrusion molding.

Here, "molding" means an operation of filling a powder into a predetermined fixed frame. By the sintering operation, the shape of the member is finally fixed.

Step (II):

In the step (II), the molded product obtained by the step (I) is heat treated in vacuum at a temperature 1600 to 2100° C. so that the total amount of the alkali metal, the alkaline earth metal and the transition metal element in the molded product becomes 300 ppm or below. At this time, the vacuum pressure will desirably be 10 Pa or below, more desirably 5 Pa or below. If the pressure exceeds 10 Pa, it becomes difficult to remove the above elements effectively.

The temperature of the heat-treatment is 1600 to 2100° C., preferably 1800 to 2000° C. If the temperature of the heat-treatment is lower than 1600° C., it becomes difficult to remove metallic elements. If the temperature exceeds 2100° C., the added silicon carbide is scattered to prevent making the product dense, and further, a decrease of strength occurs.

Step (III):

In the step (III), the molded article heat-treated in the step (II) is fired at a temperature of 1900 to 2250° C. to make the molded product dense with a relative density of at least 96%. The above firing temperature is preferably 1900 to 2100° C. The firing, for example, is carried out in vacuum, especially in vacuum of 10 Pa or below, or in an inert atmosphere, especially in an argon gas. If the firing temperature exceeds 2250° C., boron carbide particles grow, and the strength of the sintered body invites lowered strength. If the firing temperature is lower than 1900° C., it is difficult to make the sintered product dense to a relative density of at least 96%.

As methods of firing, firing under normal pressure (ordinary firing), and hot press firing may also be carried out while applying a mechanical pressure of 200 kg/cm², In the above-mentioned hot press method, a boron carbide powder or a sintering composition is filled in a hot press mold (step (I)). Then, the above heat-treatment is carried out (step (II)). Then, the molded product is fired under the above conditions (step (III)) while a mechanical pressure of at least 500 Kg/cm² is applied. This is advantageous because the product can be made dense within a short period of time.

[Utility]

According to this invention, a corrosion-resistant member composed of a boron carbide sintered body which is dense and has high purity and high strength can be provided. When it is used as a jig and a susceptor for a semiconductor producing apparatus, these parts hardly cause contamination of semiconductors.

The corrosion-resistant members of this invention are members having a high strength and electric conductivity. They are preferably used as parts in an apparatus of producing semiconductors such as jigs including electrodes and susceptors used in a dry etching process or a film-forming process used in a halogen gas or its plasma atmosphere, and a chamber (wall member) for an apparatus for producing semiconductors.

Since silicon wafers become made have a large diameter and a production apparatus and component parts themselves become large-sized, corrosion-resistant members having a strength of at least 300 MPa have been desired to obtain reliability as materials for constituting a chamber, a protective cover and a liner.

EXAMPLES

Example 1

The results of a specific plasma irradiation experiment will be mentioned.

As a B$_4$C sintered body a sintered product of boron carbide having a relative density of 99.1% and containing an alkali metal, an alkaline earth metal and a transition metal in a total amount of 90 ppm was prepared by heat-treating boron carbide powder having a cation impurities of 1000 ppm in vacuum at a temperature of 2000° C. under 1 Pa, and then firing the heat-treated product at a temperature of 2180° C. in a nitrogen atmosphere. This sintered product had a four-point bending strength of 420 MPa in accordance with JIS R1601. Furthermore. the contents of metal elements were measured by Inductive Coupled Plasma Atomic Emission Spectroscopy Analysis Method.

By using the same starting material, various $B_4C$ sintered bodies having different relative densities were prepared by firing the starting material with hot pressing at a temperature of 2020 to 2300° C. Furthermore, C (5.0% by weight) and SiC (0.8% by weight) were used as sintering aids and the mixtures of $B_4C$ powder and sintering aids were fired under a pressure of 300 kg/cm$^2$ in an atmosphere of Ar.

For comparison, various sintered bodies other than $B_4C$ were prepared. First, BN powder having a purity of 99.5% was fired at 2000° C. by using a hot press.

A sintered body of $Si_3N_4$ was prepared by adding 3% by weight of $Y_2O_3$ and 4% by weight of $Al_2O_3$ as sintering aids and mixing them with $Si_3N_4$ powder. The mixture was fired in a nitrogen atmosphere at 1750° C. To prepare a sintered body of SiC, 0.6% by weight of $B_4C$ and 2% by weight of carbon were added to α-SiC powder and the mixture was fired at 2060° C. in a non-oxidizing atmosphere. To prepare a sintered body of $Al_2O_3$, the powder of $Al_2O_3$ was fired at 1800° C. in an atmosphere without using any sintering aid. A sintered body of AlN was prepared by firing AlN in a nitrogen atmosphere at 2060° C. without adding any sintering aid. Furthermore, Si polycrystalline body and $SiO_2$ single crystal (quartz) were prepared.

The relative densities of the sintered bodies were calculated by the Archimedes method (JIS R2205). The flexural strengths of the sintered bodies were measured by a four-point bending method at room temperature (25° C.).

Members prepared from these sintered bodies were exposed co fluorine-type plasma of $CF_4$ (60 sccm)+Ar (60 sccm) and SFG (80 sccm) at room temperature, and the etching rate and the presence or absence of particles were examined. The results are shown in Tables 1 and 2. The etching conditions included a pressure of 10 Pa, RF output of 1 kW, and a plama irradiating time of 3 hours. The etching rate was calculated based on changes of weight before and after the test. The presence or absence of particles was evaluated by observing the surface of a sample with an electron microscope, and examining the presence or absence of adhesion of particles having a diameter of not smaller than 3 μm to the surface.

○: The occurrence of particles was hardly none.

Δ: The occurrence of particles was little (less than 1000 pieces/in a 8-inch wafer).

X: The particles occurred considerably (at least 1000 pieces/in a 8-inch wafer).

In all samples described in Tables 1 and 2, the contents of metal elements were 100 ppm or below as a total amount.

TABLE 1

| | | | | | Reaction product with a gas | | | | |
|---|---|---|---|---|---|---|---|---|---|
| Sample No. | Material | Mode of the sample | Relative density (%) | Etching gas type | Product | Vapor pressure (10 Torr) (° C.) | Melting point (° C.) | Etching rate (Å/min) | Occurence of particles |
| *1 | BN | sintered body | 98.8 | $CF_4$ + Ar | $BF_3$ | −141 | −127 | 58000 | ○ |
| 2 | $B_4C$ | sintered body | 99.1 | $CF_4$ + Ar | $BF_3$ | −141 | −127 | 72 | ○ |
| 3 | $B_4C$ | sintered body | 99.1 | $SF_6$ | $BF_3$ | −141 | −127 | 56 | ○ |
| *4 | Si | polycrystal | 100 | $CF_4$ + Ar | $SiF_4$ | −130 | −90 | 260 | ○ |
| *5 | $SiO_2$ | single crystal | 100 | $CF_4$ + Ar | $SiF_4$ | −130 | −90 | 650 | ○ |
| *6 | $Si_3N_4$ | sintered body | 99.9 | $CF_4$ + Ar | $SiF_4$ | −130 | −90 | 1500 | X |
| *7 | SiC | sintered body | 99.7 | $CF_4$ + Ar | $SiF_4$ | −130 | −90 | 470 | Δ |
| *8 | $Al_2O_3$ | sintered body | 99.9 | $CF_4$ + Ar | $AlF_3$ | 1043 | 1040 | 63 | X |
| *9 | AlN | sintered body | 99.8 | $SF_6$ | $AlF_3$ | 1043 | 1040 | 35 | X |

*shows samples outside the range of the invention.

TABLE 2

| | Firing conditions of $B_4C$ sintered bodies | | | Relative | | Etching | Etching | Occurrence |
|---|---|---|---|---|---|---|---|---|
| Sample No. | Temp. (° C.) | Atmosphere | Aid (wt %) | density (%) | Strength (MPa) | gas type | rate (Å/min) | of particles |
| 10 | 2300 | $N_2$ | none | 98.2 | 280 | $CF_4$ + Ar | 77 | ○ |
| 11 | 2250 | $N_2$ | none | 99.5 | 480 | $CF_4$ + Ar | 70 | ○ |
| 12 | 2100 | $N_2$ | none | 98.4 | 330 | $CF_4$ + Ar | 84 | ○ |
| 13 | 2020 | $N_2$ | none | 97.3 | 250 | $CF_4$ + Ar | 120 | ○ |

TABLE 2-continued

| Sample No. | Firing conditions of B₄C sintered bodies | | | Relative density (%) | Strength (MPa) | Etching gas type | Etching rate (Å/min) | Occurrence of particles |
|---|---|---|---|---|---|---|---|---|
| | Temp. (°C.) | Atmosphere | Aid (wt %) | | | | | |
| 14 | 2230 | Ar | C 5.0 | 99.1 | 410 | CF₄ + Ar | 81 | ○ |
| 15 | 2200 | Ar | SiC 0.8 | 98.4 | 350 | CF₄ + Ar | 77 | ○ |

According to the results of Table 1, sample No. 1 composed of BN sintered body was much consumed, and could not withstand use. Samples Nos. 4 to 6 composed of Si, SiO₂ (quartz) and Si₃N₄ sintered bodies consume violently, and in the sample No. 6 composed of Si₃N₄ sintered body, Si₃N₄ particles were selectively etched, and the remaining intergranular phase became a cause of the occurrence of particles. The sample No. 7 composed of SiC sintered body had a surface discolored in black and the carbon was precipitated. The samples Nos. 8 and 9 composed of Al₂O₃ sintered body and AlN sintered body showed a low etching rate, but particles were removed (occurrence of void) on the surface, and a fluoride was accumulated. On the other hand, samples Nos. 2 and 3 composed of B₄C sintered bodies had a low etching rate, and particles were not removed on the surface, and the product was not accumulated.

According to the results shown in Table 2, of the samples Nos. 10 to 14 produced by firing with hot pressing, the sample No. 10 showed a rapid growth of particles but its strength tends to be lowered. Sample No. 13 was fully practical, but had a relative density higher than 96% but lower than 98%, but as compared with other samples, the strength tends to be lowered. A pore on the etching surface acted as a starting point, and corrosion proceeded. Thus, corrosion resistance tended to be decreased. The other samples showed extremely good characteristics in respect of hot pressing firing, and firing in an atmosphere to which aids were added.

Example 2

The same material as in Example 1 was exposed to a chlorine plasma of BCl₃ (100 sccm) at room temperature, and the etching rate and the presence or absence of particles were examined. The etching conditions included a pressure of 4 Pa, an RF output of 1.8 kW, and a plasma irradiation tine of 3 hours. The method of evaluation was the same as in Example 1.

TABLE 3

| Sample No. | Material | Mode of the sample | Relative density (%) | Etching gas type | Reaction product with a gas | | | Etching rate (Å/min) | Occurence of particles |
|---|---|---|---|---|---|---|---|---|---|
| | | | | | Product | Vapor pressure (10 Torr) (°C.) | Melting point (°C.) | | |
| *16 | BN | sintered body | 98.8 | BCl₃ | BCl₃ | −67 | −107 | 38000 | ○ |
| 17 | B₄C | sintered body | 99.1 | BCl₃ | BCl₃ | −67 | −107 | 25 | ○ |
| *18 | Si | polycrystal | 100 | BCl₃ | SiCl₄ | −34 | −69 | 1800 | ○ |
| *19 | SiO₂ | single crystal | 100 | BCl₃ | SiCl₄ | −34 | −69 | 560 | ○ |
| *20 | SiC | sintered body | 99.7 | BCl₃ | SiCl₄ | −34 | −69 | 760 | Δ |
| *21 | Al₂O₃ | sintered body | 99.9 | BCl₃ | AlCl₃ | 124 | 190 | 260 | X |
| *22 | AlN | sintered body | 99.8 | BCl₃ | AlCl₃ | 124 | 190 | 920 | X |

*shows samples outside the range of the invention.

TABLE 4

| Sample No. | Firing conditions of B₄C sintered bodies | | | Relative density (%) | Strength (MPa) | Etching gas type | Etching rate (Å/min) | Occurrence of particles |
|---|---|---|---|---|---|---|---|---|
| | Temp. (°C.) | Atmosphere | Aid (wt %) | | | | | |
| 23 | 2300 | N₂ | none | 98.2 | 280 | BCl₃ | 44 | ○ |
| 24 | 2250 | N₂ | none | 99.5 | 480 | BCl₃ | 25 | ○ |
| 25 | 2100 | N₂ | none | 98.4 | 330 | BCl₃ | 68 | ○ |
| 26 | 2020 | N₂ | none | 97.3 | 250 | BCl₃ | 110 | ○ |
| 27 | 2230 | Ar | C 5.0 | 99.1 | 410 | BCl₃ | 42 | ○ |
| 28 | 2200 | Ar | SiC 0.8 | 98.4 | 350 | BCl₃ | 50 | ○ |

According to Table 3, a sample No. 16 composed of BN sintered body consumed very much and could not withstand use. When other materials in the same way as in Example 1 were considered in view of the etching rate and the formation of particles in the resulting product, $B_4C$ sintered body showed especially excellent characteristics.

According to Table 4, a sample No. 26 having a relative density higher than 96% but lower than 98% was fully practical, but in the same way as in Example 1, this sample tended to show a lowered strength and corrosion resistance. Other sintered bodies showed good characteristics in respect of hot press firing and firing in an atmosphere to which sintering aids were added.

By using a member composed of a $B_4C$ sintered body, a member for the production of semiconductors could be realized which member had excellent corrosion resistance to a fluorine-type or chlorine-type gas and did not generate contamination or particles.

Example 3

A boron carbide powder containing 840 ppm of Na, 120 ppm of Ca and 300 ppm of Fe, and an average particle diameter of 0.8 μm (A-1; H. C. Starck-V TECH LTD.: tradename HS) was used.

As a silicon carbide powder, a powder having an average particle diameter of 0.6 μm (B-1: Yakushima Denko Co., Ltd.; tradename OY-15) and another powder convertible to silicon carbide by heat decomposition at a high temperature (B-2: Nippon Carbon Co., Ltd.; tradename Polycarbosila NIPUSI-S, Powder polycarbosilane) were used. Incidentally, B-2 was used as a solution in an organic solvent.

As a carbon source, a phenol resin having a carbonization rate of 40% was used. This C-1 was used as a solution in an organic solvent.

As Comparative Examples, a boron carbide powder having an average particle diameter of 20 μm (A-2: produced by The Electro Chemical Industrial Co., Ltd., tradename F3). a silicon carbide powder having an average particle diameter of 5 μm (B-3: produced by Showa Denko Co., Ltd.) and a carbon powder having an average particle diameter of 400 Å (C-2: produced by The Electro Chemical Industrial Co., Ltd., tradename Acetylene Black Denka Black) were used.

The above boron carbide powder, the silicon carbide powder and the carbon source were combined in the combinations shown in Table 5 in recipes shown in Table 5, and mixed in an organic solvent using plastic balls and dry powder were obtained by using an evaporator. In Table 5, wt % means % by weight, and sample numbers shown by * are outside the range of the present invention (comparative examples).

Firing was carried out by using a hot press (HP) firing apparatus and an atmospheric firing apparatus (PLS). In the hot press firing, a mixed powder composed of a boron carbide powder, a silicon carbide source and a carbon source was put into a carbon mold, then the mixed powder was heat-treated for 2 hours at a temperature indicated in Table 5, and then held for 2 hours at a firing temperature shown in Table 5 under a pressure of 30 MPa (megapascal) to fire the mixed powder.

In the case of firing in an atmosphere, a mixed powder composed of the boron carbide powder, the silicon carbide source and the carbon source was treated under hydrostatic pressure using a pressure of 3 t/cm² (t: ton) to produce a molded article. The molded article was heat-treated for 2 hours, and then held for 3 hours at a firing temperature shown in Table 5 and fired.

Test pieces were cut out from the resulting sintered product, and polished and processed. Their specific gravity was measured in accordance with JIS R2205, and their relative density was sought. The strength (flexural strength) of the sintered body was measured to obtain strength at room temperature by a test of a four-point bending (in accordance with JIS R1601). Furthermore, two samples were crushed, and by Inductive Coupled Plasma Atomic Emission Spectroscopy Analyzing Method, the amounts of Na, Ca and Fe were measured.

TABLE 5

| Sample No. | Boron carbide powder type | Silicon carbide type | wt % | Carbon type | wt % | Method of firing | Heat treating temp. (° C.) | Degree of vacuum (Pa) | Firing temp. (° C.) | Relative density (%) | Flexural strength (MPa) | Impurities (ppm) Na | Ca | Fe |
|---|---|---|---|---|---|---|---|---|---|---|---|---|---|---|
| *1 | A-1 | — | — | — | — | HP | — | 1 | 2200 | 94 | 100 | 740 | 110 | 260 |
| *2 | A-1 | — | — | — | — | HP | 2000 | 1 | 2200 | 94 | 110 | <10 | <10 | <10 |
| *3 | A-1 | B-1 | 1.0 | — | — | HP | 2000 | 1 | 2100 | 95 | 150 | <10 | <10 | <10 |
| *4 | A-1 | — | — | C-1 | 2.0 | HP | 2000 | 1 | 2100 | 95 | 160 | <10 | <10 | <10 |
| 5 | A-1 | B-1 | 0.05 | C-1 | 2.0 | HP | 2000 | 1 | 2100 | 96 | 230 | <10 | <10 | <10 |
| 6 | A-1 | B-1 | 0.1 | C-1 | 2.0 | HP | 2000 | 1 | 2100 | 96 | 250 | <10 | <10 | <10 |
| 7 | A-1 | B-1 | 0.5 | C-1 | 2.0 | HP | 2000 | 1 | 2100 | 97 | 400 | <10 | <10 | <10 |
| 8 | A-1 | B-1 | 1.0 | C-1 | 2.0 | HP | 2000 | 1 | 2100 | 99 | 430 | <10 | <10 | <10 |
| 9 | A-1 | B-1 | 2.0 | C-1 | 2.0 | HP | 2000 | 1 | 2100 | 99 | 380 | <10 | <10 | <10 |
| 10 | A-1 | B-1 | 4.0 | C-1 | 2.0 | HP | 2000 | 1 | 2100 | 99 | 350 | <10 | <10 | <10 |
| 11 | A-1 | B-1 | 5.0 | C-1 | 2.0 | HP | 2000 | 1 | 2100 | 99 | 250 | <10 | <10 | <10 |
| 12 | A-1 | B-1 | 1.0 | C-1 | 0.5 | HP | 2000 | 1 | 2100 | 98 | 240 | <10 | <10 | <10 |
| 13 | A-1 | B-1 | 1.0 | C-1 | 1.0 | HP | 2000 | 1 | 2100 | 99 | 350 | <10 | <10 | <10 |
| 14 | A-1 | B-1 | 1.0 | C-1 | 3.0 | HP | 2000 | 1 | 2100 | 99 | 330 | <10 | <10 | <10 |
| 15 | A-1 | B-1 | 1.0 | C-1 | 4.0 | HP | 2000 | 1 | 2100 | 99 | 380 | <10 | <10 | <10 |
| 16 | A-1 | B-1 | 1.0 | C-1 | 5.0 | HP | 2000 | 1 | 2100 | 98 | 290 | <10 | <10 | <10 |
| *17 | A-1 | B-1 | 1.0 | C-1 | 7.0 | HP | 2000 | 1 | 2100 | 95 | 160 | <10 | <10 | <10 |
| *18 | A-1 | B-1 | 1.0 | C-1 | 2.0 | HP | 1500 | 1 | 2100 | 99 | 440 | 170 | 80 | 150 |

TABLE 5-continued

| Sample No. | Boron carbide powder type | Silicon carbide type | wt % | Carbon type | wt % | Method of firing | Heat treating temp. (° C.) | Degree of vacuum (Pa) | Firing temp. (° C.) | Relative density (%) | Flexural strength (MPa) | Impurities (ppm) Na | Ca | Fe |
|---|---|---|---|---|---|---|---|---|---|---|---|---|---|---|
| 19 | A-1 | B-1 | 1.0 | C-1 | 2.0 | HP | 1600 | 1 | 2100 | 99 | 430 | 70 | 35 | 80 |
| 20 | A-1 | B-1 | 1.0 | C-1 | 2.0 | HP | 1800 | 1 | 2100 | 99 | 440 | 15 | 15 | 20 |
| *21 | A-1 | B-1 | 1.0 | C-1 | 2.0 | HP | 2200 | 1 | 2100 | 95 | 170 | <10 | <10 | <10 |
| *22 | A-2 | B-1 | 1.0 | C-1 | 2.0 | HP | 2000 | 1 | 2100 | 93 | 70 | <10 | <10 | <10 |
| 23 | A-1 | B-2 | 1.0 | C-1 | 2.0 | HP | 2000 | 1 | 2100 | 99 | 460 | <10 | <10 | <10 |
| *24 | A-1 | B-1 | 1.0 | C-2 | 2.0 | HP | 2000 | 1 | 2100 | 92 | 60 | <10 | <10 | <10 |
| 25 | A-1 | B-1 | 1.0 | C-1 | 2.0 | PLS | 2000 | 1 | 2150 | 98 | 390 | <10 | <10 | <10 |
| 26 | A-1 | B-1 | 2.0 | C-1 | 3.0 | PLS | 2000 | 1 | 2150 | 99 | 440 | <10 | <10 | <10 |
| *27 | A-1 | B-3 | 1.0 | C-1 | 2.0 | HP | 2000 | 1 | 2100 | 94 | 90 | <10 | <10 | <10 |
| *28 | A-1 | B-1 | 1.0 | C-1 | 2.0 | HP | 2000 | 1 | 2100 | 99 | 410 | 520 | 110 | 150 |

*: Comparative Examples

It is seen from Table 5 that samples Nos. 1 to 4 not containing silicon carbide and carbon had low density and low strength. A sample No. 17 in which the content of carbon exceeded 10% by weight had a low density and a low strength.

A sample No. 22 using a boron carbide powder (A-2) having an average particle diameter exceeding 5 μm had a low strength. Samples Nos. 24 and 27 using silicon carbide (B-3) having an average particle diameter exceeding 1 μm and using powdery carbon (C-2) had a low density and a low strength.

A sample No. 18 having a heat-treatment temperature lower than 1600° C. had a large amount of impurity even if the relative density was 99%. A sample No. 21 in which the heat-treatment temperature exceeded 2100° C. had a low density and low strength.

On the other hand, 0.05 to 5% by weight of silicon carbide (B-1) having an average particle diameter of 1 μm or below and/or an organic silicon compound (B-2) convertible to silicon carbide by heat decomposition and 0.5 to 5% by weight, calculated as carbon, of an organic compound (C-1) convertible to carbon by heat decomposition were mixed with boron carbide powder (A-1) having an average particle diameter of 5 μm or below. The mixture was molded into a predetermined shape, then purification-treated in vacuum at a temperature of 1600 to 2100° C. and then fired at a temperature of 2250° C. or below. The samples of this invention all had a relative density of at least 96% and a strength of at least 200 MPa These samples were highly pure, and contained the alkali metal, the alkaline earth metal and the transition metal in a total amount of 300 ppm or below.

Example 4

As a boron carbide powder, powders having an average particle diameter of 0.8 μm and containing 840 ppm of Na, 120 ppm of Ca and 300 ppm of Fe (samples Nos. 1 to 33) and a powder having an average particle diameter of 20 μm (a sample No. 34) were used.

As a metallic boron powder, a powder having an average particle diameter of 1 μm was used. A metallic Si powder having an average particle diameter of 4 μm was used. As a silicon carbide powder, α-silicon carbide powder having an average particle diameter of 0.6 μm was used. As a carbon source, a phenolic resin having a carbonization rate of 20% was used as a solution in an organic solvent.

The above boron carbide powder, the metallic boron or the silicon carbide source were combined as shown in Tables 6 to 8 and weighed in the blended amounts shown these Tables 6 to 8. These materials were mixed by using plastic balls in an organic solvent to prepare dry powders using an evaporator.

Firing was carried out by using a hot press firing apparatus (H.P) and an ordinary firing apparatus (PLS). In the case of hot press firing, the mixed powder was put into a carbon mold, heat-treated for 2 hours in vacuum under 5 Pa at the temperatures shown in Tables 6 to 8, and held in argon for 2 hours under a pressure of 300 kg/cm² at the temperatures shown in the Tables to fire the mixed powder. In the ordinary firing, the powder was treated under hydrostatic pressure at a pressure of 3 t/cm to prepare a molded product, then the molded product was heat-treated for 2 hours in vacuum under 5 Pa at the temperatures shown in Tables 6 to 8, and thereafter, held for 3 hours in argon at the temperatures shown in Tables 6 to 8 to fire the molded product.

For comparison, a carbon powder was fired in vacuum at 2500° C. for 5 hours to prepare a graphite sintered body (a sample No. 35).

A test piece was cut out from the resulting sintered body, and polished and processed. Its specific gravity was measured in accordance with JIS R2205, and its relative density was measured. The strength of the sample was measured from a four-point bending test in accordance with JIS R2205 at room temperature. Furthermore, the sample was pulverized and subjected to X-ray diffraction measurement. The peak intensity ratio was sought from Ib/Ia in which Ia is a peak intensity Ia of a diffraction peak assigned to (311) face of the $B_4C$ phase and Ib is a peak intensity of a diffraction peak assigned to (002) face of the graphitee phase. The X-ray diffraction measurement was carried out by using RINT 1400V type produced by Rigaku Denki Co., Ltd. with Cu-Kα Ray.

Figure 2:
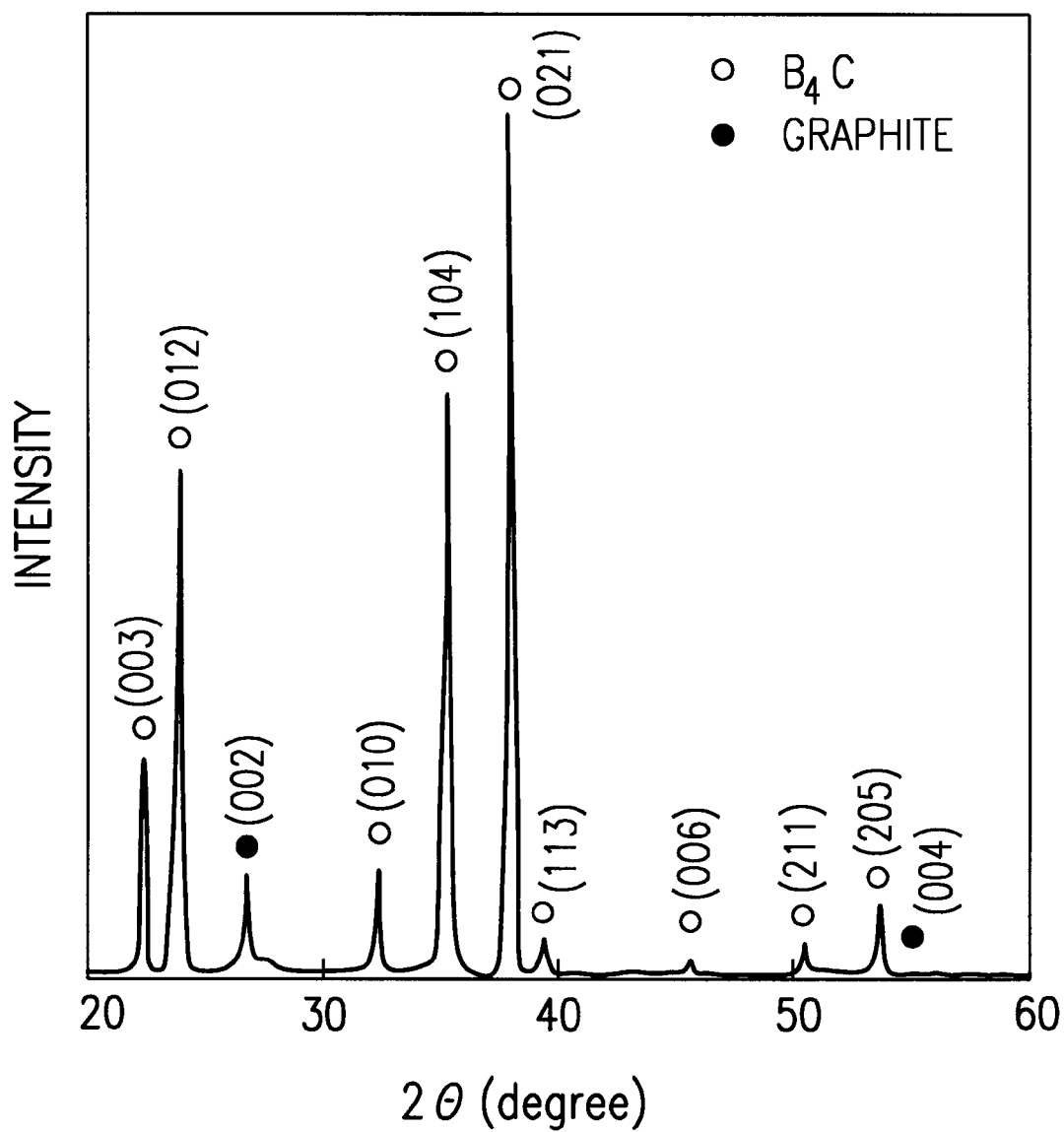
FIG. 2 is a diagram showing an X-ray diffraction chart of a conventional boron carbide sintered body (sample No. 1 in Example 4).

The results of X-ray diffraction measurement of a sample No. 3 (invention) and a sample No. 1 (comparative example) are shown in FIGS. 1 and 2. Furthermore, the pulverized powders were subjected to inductive coupled plasma atomic emission spectroscopy analyzing method, and the amounts of the alkali metal, the alkaline earth metal and the transition metal were measured.

These samples were put into a reactive ion etching apparatus. A chlorine gas was introduced into this apparatus, and the pressure in this apparatus was held at 7 to 10 Pa. A high frequency of 13.56 MHz and 1 KW was introduced to generate a plasma to contact the samples with the plasma. The temperatures of the samples were set at room temperature (25° C.). Under the above conditions, the etching treatment was carried out for 3 hours, and then the etching speed was calculated from the decrease of weight of the sample.

From the obtained sintered bodies, the amount of silicon carbide was calculated. Since metallic silicon was not detected from the sintered body, the silicon carbide was calculated from the total amout of silicon in the sintered body.

TABLE 6

| Sample No. | Composition (wt. %) | | Heat-treating temp. (° C.) | Firing conditions | | Relative density (%) | Amount of impurities (ppm) | | | Strength (MPa) | Ib/Ia | Etching speed (Å/min) |
|---|---|---|---|---|---|---|---|---|---|---|---|---|
| | B | C | | method | temp. (° C.) | | Alkali metal | Alkaline earth metal | Transition metal | | | |
| 1 | — | 2 | 2000 | HP | 2200 | 98.2 | <10 | <10 | <10 | 200 | 0.05 | 110 |
| 2 | 4 | 2 | 2000 | HP | 2200 | 98.1 | <10 | <10 | <10 | 220 | 0 | 8 |
| 3 | 8 | 2 | 2000 | HP | 2200 | 97.2 | <10 | <10 | <10 | 230 | 0 | 7 |
| 4 | 12 | 2 | 2000 | HP | 2200 | 96.3 | <10 | <10 | <10 | 210 | 0.008 | 28 |
| *5 | 15 | 2 | 2000 | HP | 2200 | 93.0 | <10 | <10 | <10 | 190 | 0.021 | 71 |
| *6 | 8 | 0.2 | 2000 | HP | 2200 | 95.6 | <10 | <10 | <10 | 180 | 0.023 | 82 |
| 7 | 8 | 0.5 | 2000 | HP | 2200 | 96.1 | <10 | <10 | <10 | 220 | 0.007 | 23 |
| 8 | 8 | 1.0 | 2000 | HP | 2200 | 96.8 | <10 | <10 | <10 | 250 | 0 | 9 |
| 9 | 8 | 3.0 | 2000 | HP | 2200 | 97.8 | <10 | <10 | <10 | 260 | 0 | 8 |
| 10 | 8 | 5.0 | 2000 | HP | 2200 | 96.1 | <10 | <10 | <10 | 230 | 0.010 | 35 |
| *11 | 8 | 6.0 | 2000 | HP | 2200 | 94.9 | <10 | <10 | <10 | 170 | 0.03 | 121 |

*shows samples outside the range if the invention

TABLE 7

| Sample No. | Composition (wt. %) | | | Heat-treating temp. (° C.) | Firing conditions | | Relative density (%) | Amount of impurities (ppm) | | | Amount of SiC (wt. %) | Strength (MPa) | Ib/Ia | Etching speed (Å/min) |
|---|---|---|---|---|---|---|---|---|---|---|---|---|---|---|
| | SiC | Si 1) | C | | method | temp. (° C.) | | Alkali metal | Alkaline earth metal | Transition metal | | | | |
| 12 | — | 2.0 | 2 | 2000 | HP | 2100 | 96.1 | <10 | <10 | <10 | 2.0 | 290 | 0 | 20 |
| 13 | — | 3.0 | 2 | 2000 | HP | 2100 | 96.8 | <10 | <10 | <10 | 3.0 | 300 | 0 | 15 |
| 14 | 0.05 | 2.5 | 2 | 2000 | HP | 2100 | 96.2 | <10 | <10 | <10 | 2.55 | 300 | 0 | 34 |
| 15 | 0.5 | 2.5 | 2 | 2000 | HP | 2100 | 96.9 | <10 | <10 | <10 | 3.0 | 310 | 0 | 18 |
| 16 | 1 | 2.5 | 2 | 2000 | HP | 2100 | 97.3 | <10 | <10 | <10 | 3.5 | 350 | 0.006 | 17 |
| 17 | 2 | 2.5 | 2 | 2000 | HP | 2100 | 98.6 | <10 | <10 | <10 | 4.5 | 360 | 0 | 6 |
| *18 | 2 | — | 2 | 2000 | HP | 2100 | 98.5 | <10 | <10 | <10 | 2.0 | 350 | 0.050 | 121 |
| 19 | 2 | 0.5 | 2 | 2000 | HP | 2100 | 98.6 | <10 | <10 | <10 | 2.5 | 340 | 0.010 | 35 |
| 20 | 2 | 1 | 2 | 2000 | HP | 2100 | 98.8 | <10 | <10 | <10 | 3.0 | 390 | 0.006 | 21 |
| 21 | 2 | 2 | 2 | 2000 | HP | 2100 | 98.6 | <10 | <10 | <10 | 4.0 | 400 | 0 | 7 |

* marks show samples outside the range of the invention.
1) shows the amount calculated as SiC.

TABLE 8

| Sample No. | Composition (wt. %) | | | Heat-treating temp. (° C.) | Firing conditions | | Relative density (%) | Amount of impurities (ppm) | | | Amount of SiC (wt. %) | Strength (MPa) | Ib/Ia | Etching speed (Å/min) |
|---|---|---|---|---|---|---|---|---|---|---|---|---|---|---|
| | SiC | Si 1) | C | | method | temp. (° C.) | | Alkali metal | Alkaline earth metal | Transition metal | | | | |
| *22 | 2 | 2 | 2 | — | HP | 2100 | 98.4 | 740 | 110 | 280 | 4.0 | 389 | 0 | 6 |
| 23 | 2 | 2 | 2 | 1400 | HP | 2100 | 98.5 | 80 | 40 | 70 | 4.0 | 398 | 0 | 7 |
| 24 | 2 | 2 | 2 | 1600 | HP | 2100 | 98.6 | 25 | 25 | 30 | 4.0 | 412 | 0 | 7 |

TABLE 8-continued

| Sample No. | Composition (wt. %) SiC | Composition (wt. %) Si 1) | Composition (wt. %) C | Heat-treating temp. (° C.) | Firing conditions method | Firing conditions temp. (° C.) | Relative density (%) | Amount of impurities (ppm) Alkali metal | Amount of impurities (ppm) Alkaline earth metal | Amount of impurities (ppm) Transition metal | Amount of SiC (wt. %) | Strength (MPa) | Ib/Ia | Etching speed (Å/min) |
|---|---|---|---|---|---|---|---|---|---|---|---|---|---|---|
| 25 | 2 | 2 | 2 | 1800 | HP | 2100 | 98.5 | 15 | 15 | 20 | 4.0 | 396 | 0 | 5 |
| *26 | 2 | 2 | 2 | 2200 | HP | 2100 | 95.1 | <10 | <10 | <10 | 4.0 | 189 | 0.020 | 99 |
| *27 | 2 | 2 | — | 2000 | HP | 2100 | 93.2 | <10 | <10 | <10 | 4.0 | 134 | 0 | 8 |
| 28 | 2 | 2 | 0.5 | 2000 | HP | 2100 | 97.2 | <10 | <10 | <10 | 4.0 | 340 | 0.007 | 18 |
| 29 | 2 | 2 | 2 | 2000 | HP | 2100 | 98.4 | <10 | <10 | <10 | 4.0 | 376 | 0 | 5 |
| *30 | 2 | 2 | 7 | 2000 | HP | 2100 | 96.1 | <10 | <10 | <10 | 4.0 | 187 | 0.020 | 98 |
| *31 | 2 | 2.5 | 2 | 2000 | HP | 1800 | 94.1 | <10 | <10 | <10 | 4.5 | 146 | 0.030 | 112 |
| 32 | 2 | 2.5 | 2 | 2000 | PLS | 2200 | 97.5 | <10 | <10 | <10 | 4.5 | 254 | 0.005 | 21 |
| *33 | 2 | 2.5 | 2 | 2000 | HP | 2100 | 94.1 | <10 | <10 | <10 | 4.5 | 187 | 0 | 67 |
| *34 | — | — | — | — | PLS | 2500 | 90.0 | <10 | <10 | <10 | — | 78 | — | 439 |

*marks show samples outside the range of the invention.
1) shows the amount calculated as SiC.

Tables 6 to 8 show that the samples within the range of this invention are highly pure and have high stregnth of at least 200 MPa and have excellent plasma resistance having an etching speed of 40 Å/min. or below. Especially when the sintered bodies contain silicon carbide, the strength of the sintered bodies increased.

On the other hand, the graphite sintered body had a remarkably high etching speed but low plasma resistance. But a sample No. 18 not containing metallic boron or metallic silicon had a peak intensity ratio of higher than 0.01. It contained a different phase organization in which the graphite phase in the primary starting material segregated, and had low plasma resistance.

What is claimed:

1. A corrosion-resistant member to be used in a region in which a gas or plasma of a halogen compound is used in a process of producing a semiconductor, wherein at least surface to be exposed to the gas or plasma is formed of a boron carbide sintered body comprising 0.5 to 5% by weight silicon carbide, at least 95% by weight boron carbide with 2000 ppm or less cationic impurities having a relative density of at least 96%, and containing 300 ppm or less total of metal, selected from the group consisting of an alkali metal, an alkaline earth metal and a transition metal wherein in an X-ray diffraction measurement of the boron carbide sintered body, when Ia is the peak intensity of a diffraction peak assigned to (311) face of boron carbide and Ib is the peak intensity of a diffraction peak assigned to (002) face of graphite, the peak intensity ration expressed by Ib/Ia is 0.01 or below.

2. A corrosion-resisiant member of claim 1 wherein the sintered body comprises boron carbide as a main component and 0.5 to 1% by weight of silicon carbide.

3. Corrosion resistant parts for use a semiconductor production process employing a halogen gas or a halogen plasma, wherein at least a surface exposed to the halogen gas or halogen plasma is formed of a boron carbide sintered body having a relative density of at least 96% and containing 300 ppm or less in total of an alkali metal, an alkaline earth metal and a transition metal.

4. The corrosion resistant parts of claim 3, wherein the sintered body comprises boron carbide as a main component and further comprises 0.5% to 5% by weight silicon carbide.

5. Corrosion resistant parts for use a semiconductor production process employing a halogen gas or a halogen plasma, wherein in an x-ray diffraction measurement of the boron carbide sintered body where Ia is a peak intensity of a diffraction peak assigned to a (311) face of boron carbide and Ib is a peak intensity of a diffraction peak assigned to a (002) face of graphite, a peak intensity ratio expressed by Ib/Iz is 0.01 or less.

* * * * *